Nov. 3, 1942.    J. W. OVERBEKE    2,300,694
VALVE
Filed Aug. 19, 1941
Fig. 1.
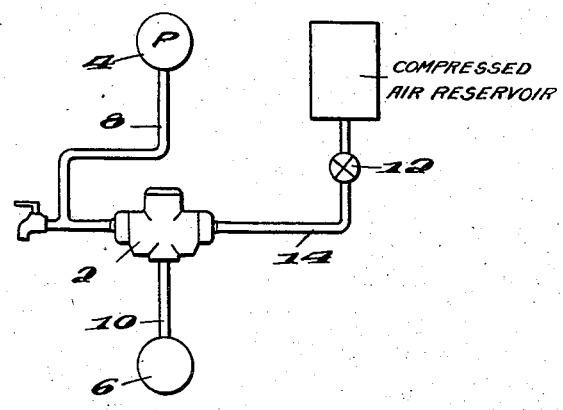
Fig. 2.
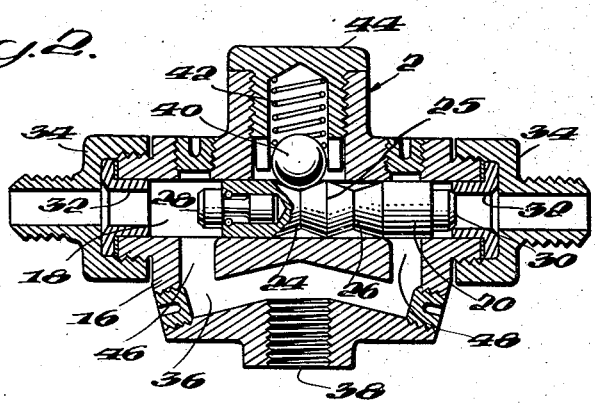
Fig. 3.
Inventor
JOHN WILLIAM OVERBEKE,
By George Douglas Jones.
Attorney Patented Nov. 3, 1942

2,300,694

UNITED STATES PATENT OFFICE 2,300,694

VALVE

John W. Overbeke, Anneslie, Md., assignor to The Glenn L. Martin Company, Baltimore, Md.

Application August 19, 1941, Serial No. 407,450

2 Claims. (Cl. 251—118)

This invention is directed to the construction of a piston valve. More particularly the invention is directed to the construction of a piston valve adapted to be inserted in a hydraulic pressure line.

It is an object of the invention to produce a piston valve which is normally held in open position for operation of a hydraulic pressure line, but which can be displaced and positively held in other positions for emergency operation with the normal hydraulic pressure cut off and emergency pressure used.

Another object of the invention is to construct a piston valve having a self-adjusting valve head to ensure a proper seating of the valve.

Another object of the invention is to produce a piston valve which is adapted to be used under pressures ranging from 700 to 2500 pounds per square inch without leakage or distortion.

Generally these objects of the invention are obtained by providing a cylinder in which a piston valve is slidably mounted. This piston valve is supplied with self-adjusting valve heads at each end adapted to engage the ports at either end of the cylinder, and is grooved about its circumference so that it can be held in selective positions by a spring pressed detent. The mean by which the objects of the invention are achieved are more fully described with reference to the accompanying drawing in which:

Fig. 1 is a diagrammatic view of a pressure system in which the novel valve is used;

Fig. 2 is a cross-sectional view through the valve; and

Fig. 3 is an enlarged detail of a portion of the valve.

In Fig. 1 the valve 2 is shown communicatively connected in a hydraulic line between a pump 4 and a motor 6 by conduits 8 and 10, respectively. Motor 6 may be used to operate doors, brakes or any other mechanisms, especially those upon an aircraft. An auxiliary source of fluid pressure is provided to operate motor 6 should the pump 4 fail. As illustrated this comprises a compressed air reservoir joined through valve 12 in conduit 14 to valve 2. Consequently if the pump 4 fails, a valve 12 is opened and the emergency fluid pressure is transmitted through valve 2 to motor 6 for actuating the same.

Details of valve 2 are more clearly shown in Fig. 2. Housing 16 is cored to form a cylinder 18 in which a piston valve 20 is mounted. Piston 20 is circumferentially grooved to provide adjacent grooves 24 and 26. Each groove has a V-shaped form in section, and the adjacent grooves join in a common edge 25. At opposite ends of piston 20, piston type valve heads 28 and 30, respectively, are mounted, these valve heads being adapted to be seated upon the ends of sleeves 32. Threaded coupling members 34 joined to the housing provide means for fastening the conduits 8 and 14 to housing 16 so that pump 4 and the compressed air reservoir can communicate with cylinder 18. A U-shaped bore 36 provides communication between the opposite ends of cylinder 18 and the outlet port 38. A detent for piston 20 comprises a ball 40 urged downwardly by spring 42 held in place by plug 44.

In Fig. 2 piston 20 is in its right hand position thus leaving port 46 uncovered and establishing communication between the pump 4 and motor 6. The piston is maintained in this position by ball detent 40 engaging groove 24. As ball 40 must either seat in groove 24 or groove 26 because of the sloping sides of the grooves and the joining line 25, piston 20 can not come to rest intermediate either of its end positions. Furthermore this ensures the firm seating of the valve heads up on either of the sleeves 32. Should pump 4 fail, valve 12 is opened and compressed air flowing through conduit 14 pushes against valve head 30, and forces piston 20 to the left until ball detent 40 engages groove 26 and valve head 28 seats upon its sleeve 32. In this position port 46 is closed off and port 48 opened so that the air from the compresed air reservoir will flow into conduit 14, cylinder 18, port 48, and bore 36 into conduit 10 to motor 6.

In Fig. 3, a detail of the mounting of one of the valve heads, for example, valve head 28 in piston 20, is shown. The valve head 28 consists of a cylindrical member 50 having a beveled edge 52 joined to a body 54 by a neck portion 56, this neck portion being of less diameter than the core in piston 20 within which the valve head is seated. Body 54 is loosely fitted in the core. Because of this reduced neck portion the valve head can move slightly radially of the piston. An annular spring 58 seated in groove 60 prevents the valve head from sliding out of the piston. As shown, spring 58 has a greater inner diameter than the diameter of neck portion 56 so that the valve head is movable. By allowing this relative movement between the valve head and the piston, and because of the beveled edge 52 on the end of the valve head, the valve head is able to engage and adjust itself to a firm, leakproof seat upon the sleeve 32.

The invention thus provides a piston valve which is movable to one of two positions and positively held in place by the spring locked ball detent, while the valve heads mounted on the piston are movable to be tightly self-seating upon the sleeves forming the inlet ports into the cylinder. A positive acting valve which is leakproof under high pressures is obtained. It is apparent that when the piston valve 20 is moved it must be moved completely into one or the other of the end positions and can not come to rest between these positions.

Having now described the means by which the objects of the invention are obtained, I claim:

1. In a piston valve, a body having a cylindrical bore, coaxial fluid flow ports at each end of said bore, and an outlet passage, a double-acting piston, a self-seating valve on each end of said piston adapted to align itself and seat on an adjacent port, a pair of contiguous, V-shaped transverse grooves on the piston so placed that a sharp edge is formed between the grooves, spring biased detent means adapted to be seated in one groove or the other to cause one of the valves to seat firmly on one or the other of the adjacent ports.

2. An automatic piston valve for a hydraulic pressure line, comprising a valve body having a cylindrical bore, a pair of fluid inlet ports to said valve body and an outlet passage, a double-acting piston valve, a self-seating valve on each end of said piston adapted to align itself and seat on an adjacent port, a pair of contiguous transverse grooves on the piston so placed that the adjacent sides of the grooves form a sharp edge, spring biased detent means adapted to be seated in one groove or the other to cause one of the valves to seat on one or the other of the adjacent ports.

JOHN W. OVERBEKE.